(12) United States Patent
Dicke

(10) Patent No.: US 6,290,444 B1
(45) Date of Patent: *Sep. 18, 2001

(54) COUNTERSUNK HEAD SCREW

(75) Inventor: Robert Dicke, Ennepetal (DE)

(73) Assignee: A-Z Ausrustung und Zubehor GmbH & Co. KG, Ruhr (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/511,461

(22) Filed: Feb. 23, 2000

(30) Foreign Application Priority Data

Feb. 23, 1999 (DE) .......................................... 299 03 232 U

(51) Int. Cl.⁷ ............................. F16B 23/00; F16B 39/282
(52) U.S. Cl. ........................ 411/399; 411/188; 411/387.2
(58) Field of Search .............................. 411/399, 387.2, 411/387.3, 187, 188, 161, 162, 959

(56) References Cited

U.S. PATENT DOCUMENTS

| | | | |
|---|---|---|---|
| 1,175,665 | * 3/1916 | Sweet | 411/399 |
| 2,037,586 | * 4/1936 | Olson | 411/399 |
| 3,903,784 | * 9/1975 | Dekker | 411/399 |
| 4,572,720 | * 2/1986 | Rockenfeller | 411/399 |
| 5,205,694 | * 4/1993 | Nagoshi | 411/399 |
| 5,249,882 | * 10/1993 | Nagoshi | 411/399 |
| 5,516,248 | * 5/1996 | DeHaitre | 411/399 |
| 5,683,217 | * 11/1997 | Walther | 411/399 |
| 5,772,376 | * 6/1998 | Koing | 411/399 |

FOREIGN PATENT DOCUMENTS

113183 * 2/1918 (GB) ................................. 411/399

* cited by examiner

Primary Examiner—Flemming Saether
(74) Attorney, Agent, or Firm—Harness, Dickey & Pierce, PLC

(57) ABSTRACT

A countersunk head screw is provided. The countersunk head screw includes a head attached to or integrally formed with the shank. A thread extends over a partial region of the shank and a portion of the head includes a bearing surface that tapers conically towards the shank. At least one cutting rib is arranged in a lower region of the bearing surface facing or adjacent the shank. Additionally, at least one restraint rib is arranged in a top region of the bearing surface turned away or spaced apart from the shank.

23 Claims, 2 Drawing Sheets

COUNTERSUNK HEAD SCREW

BACKGROUND OF THE INVENTION

1. Technical Field

The invention relates to a countersunk head screw with a head, with a shank, and with a thread extending at least partially over the shank, whereby the head, at least in sections, features a bearing surface that tapers conically toward the shank.

2. Discussion

Screws of this kind are known. For example, they may feature a drive groove, such as a slot or a cross recession for engaging the screwdriver. The open end of the shank can be shaped as a point. In particular, we can be dealing with countersunk head screws that have the effect of shaping or cutting a thread into the material into which they are screwed.

The head must be made appropriately voluminous so that there will be enough room available for the drive groove. For example, one known way to achieve this is to provide two different head sections for the bearing surface that tapers conically toward the shank. In these head sections, the bearing surface converges at different angles.

Since there is no thread on the head, a possible problem when screwing with a voluminous head is that undesired destruction of material can occur, especially on the surface, such as splintering, tearing, or deformation, depending on the material, once the screw has been completely or almost completely screwed in.

It is the objective of the invention, to improve a countersunk head screw of the type described in the introduction, so that the negative occurrences cited above can be prevented.

SUMMARY OF THE INVENTION

In accordance with the teachings of the present invention, a countersunk head screw is provided. The countersunk head screw includes a head connected or integrally formed with the shank. A thread extends at least partially over the shank and a section of the head includes a bearing surface that tapers conically toward the shank. At least one cutting rib is arranged in a lower region of the bearing surface that is facing or adjacent the shank. Additionally, at least one restraint rib is arranged in a top region of the bearing surface turned away or spaced apart from the shank.

The objective of the invention is achieved by arranging cutting ribs in a lower region of the bearing surface that is facing, or adjacent, the shank.

When a countersunk head screw in accordance with the invention is being screwed in, the cutting ribs will cause material to be removed, whereby an undesired destruction of material can be efficiently prevented, even for a countersunk head screw whose head is larger than that of standard screws.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

The same parts are given identical labels in the different figures, so that, as a rule, they will each only be described once.

Figure 1:
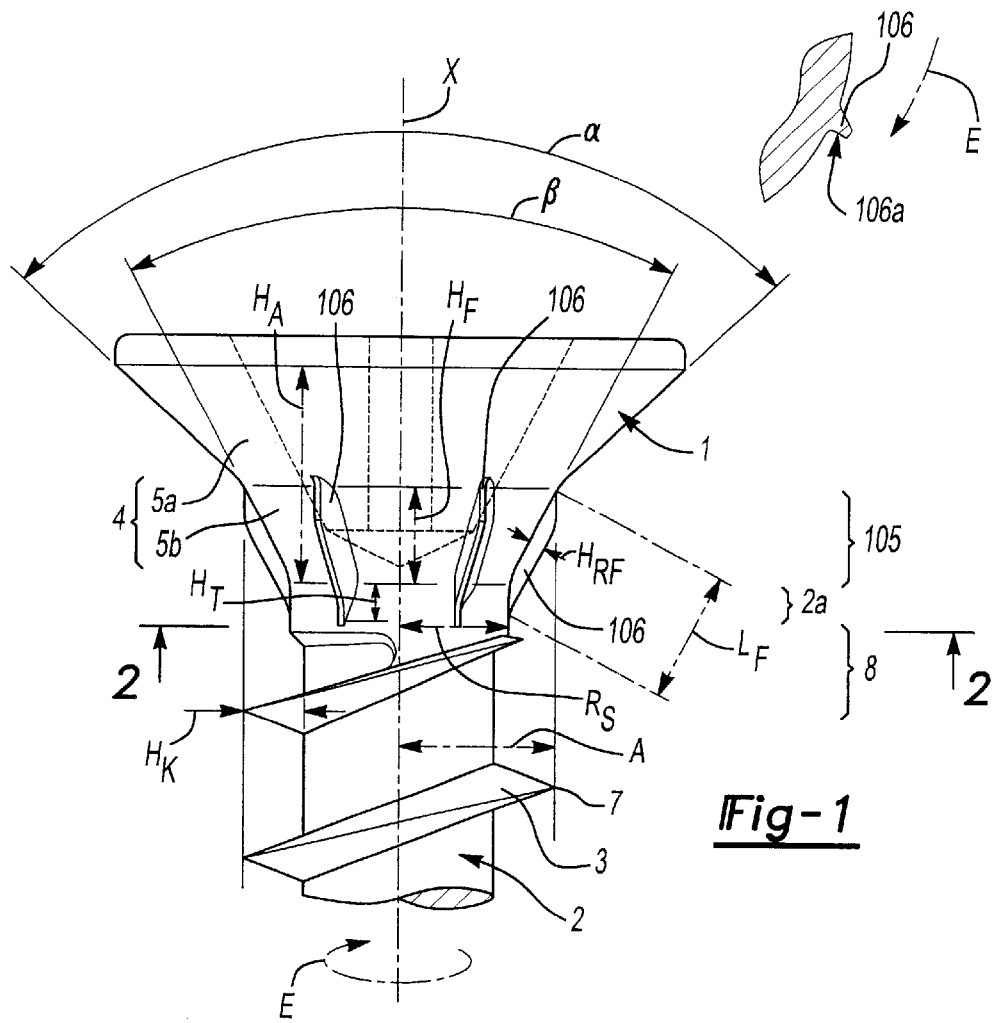
FIG. 1 is a frontal view of an enlarged representation of a first embodiment of a screw in accordance with the invention.

As shown in the drawing, a first embodiment (FIGS. 1 and 2) of a countersunk head screw in accordance with the invention features a head 1, a shank 2, and a thread 3 extending at least partially over the shank 2. The head 1, in turn, features a bearing surface 4 that, at least in sections, tapers conically toward the shank 2. Cutting ribs 106 are arranged in a lower region 105 of the bearing surface 4 that is facing, or adjacent, the shank.

Six Cutting ribs 106 are represented in the illustrated embodiment, but there also could be more or fewer, such as three, four, eight, or more. The desired removal of material, while a screw in accordance with the invention is being screwed in, can be increased or reduced based on the number and design of the cutting ribs 106, and can thereby be adapted to the material.

The bearing surface 4, tapering conically toward the shank 2, converges at an angle a of approximately 90° in a first head section 5a turned away from the shank 2 and, at an angle β of approximately 50° to 65°, in a second section 5b facing the shank 2. In this manner, enough room is attained in the head 1 for a cross recession for engaging a screwdriver, in spite of the relatively narrow shape of the head 1. The cross recession is not drawn in detail in FIG. 1, but indicated with dashed lines. The region 105 of the bearing surface 4, in which the cutting ribs 106 are arranged, thereby is the second head section 5b facing the shank 2.

In addition, the cutting ribs 106 extend up into a region 2a of the shank 2 near the head, where the shank 2 has a radius $R_S$ that is larger than a core radius $R_E$ of shank 2 in the region 2b of the thread 3. The cutting ribs 106 are each attached to the shank 2 in the region 2a near the head, thereby assuring a high mechanical stability for the cutting ribs 106.

The axial length $H_F$ of the region 105 of the bearing surface 4, in which the cutting ribs 106 are arranged, is no longer than approximately 60 percent of an axial length $H_A$ of the conically tapering bearing surface 4. Moreover, the region 2a near the head has an axial length $H_T$ which can be approximately one third of the axial length $H_F$ of region 105 lying within the bearing surface 4. The cutting ribs 106 will preferably thus only work to advantage when the head 1 of the countersunk head screw in accordance with the invention begins to penetrate the material. Material destruction, in the sense of splintering, tearing, or undesired deformation, is thereby prevented.

The longitudinal extents $L_F$ of the cutting ribs 106 can, as illustrated, follow surface lines of the bearing surface 4, with their projections falling on a section of the screw's longitudinal axis X—X of the screw in accordance with the invention, which runs through the head 1. In this manner, the milling and scraping effect, which the cutting ribs 106 exercise on the material, is particularly large.

The thread 3 features an edge 7, which, in its main region, maintains a constant clearance (outer radius A of thread 3), in the shape of a helix, to a section of the screw's longitudinal axis X—X running through the shank 2. The edge 7 of the thread can also feature a decreasing height $H_K$ in an end region 8 of the thread 3 facing the head 1. Considering their optimal arrangement for effectiveness, the cutting ribs 106 (as seen in a bottom view or in the cross sectional view shown in FIG. 2) can extend into an annular area, approximately bounded on the outside by the outer radius A of thread 3, and approximately bounded on the inside by the external radius $R_s$ of the shank 2 in the region 2a near the head.

There is moreover an additional advantage when the cutting ribs 106 feature a variable height $H_{RF}$ across their longitudinal extent $L_F$. In the shown drawing, the height $H_{RF}$ of the cutting ribs 106 increases along the outside of the longitudinal extents $L_F$ of the cutting ribs 106, starting first with a value of zero relative to the bearing surface 4, and then staying approximately constant relative to the bearing surface 4. A steady milling effect is thereby achieved along the longitudinal extent $L_F$ of the cutting ribs 106. The maximum value of the height $H_{RF}$ of the cutting ribs 106 relative to the surface 4 can thereby favorably be approximately 0.3 mm, especially when the external radius $R_K$ of the head 1 is approximately 4 to 5 mm.

An optimal design for the cutting ribs 106 occurs when, as illustrated in the drawing, they each feature an outline approximately in the shape of a circular segment, wherein the edge 106a of the segment that's facing the direction of screwing E is designed flat or concave.

Figure 3:
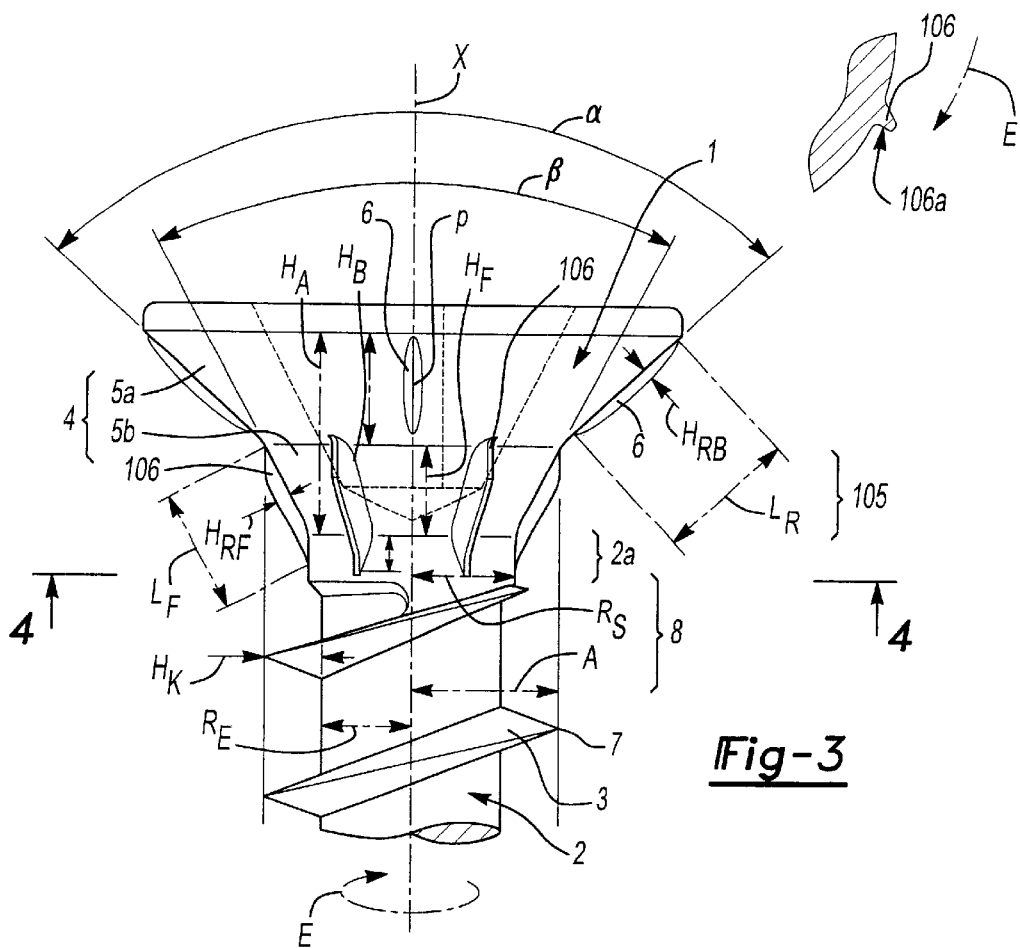
FIG. 3 is a frontal view of an enlarged representation of a second embodiment of a screw in accordance with the invention.
Figure 4:
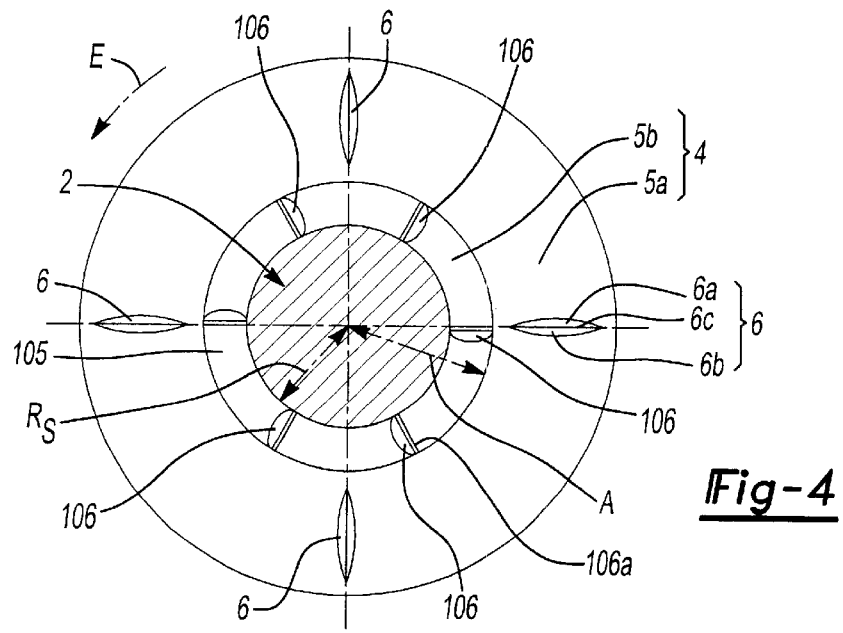
FIG. 4 is the second embodiment of a screw in accordance with the invention in a view cut along the line IV—IV in FIG. 3.

FIGS. 3 and 4 show a second embodiment of a countersunk head screw in accordance with the invention. As far as the cutting ribs 106 are concerned, this embodiment does not differ form the first embodiment described above. However, additional restraint ribs 6 have been installed in a top region 5 of the bearing surface 4 that's turned away from, or adjacent, the shank 2. When a screw in accordance with the invention is being screwed in, these restraint ribs 6 cause increased compression of the surface between the screw and the material that it's being screwed into, a fitting's metallic surface for example. This increases the frictional resistance and counteracts the screwdriver's moment of rotation, whereby spinning of the screw can be efficiently prevented.

Four restraint ribs 6 are provided in the illustrated embodiment, but there could be more or fewer, such as two, three, six, etc.

The region 5 of the bearing surface 4, in which the restraint ribs 6 are arranged, is the first head section 5a turned away from the shank 2.

The axial length $H_B$ of the region 5 of the bearing surface 4, in which the restraint ribs 6 are arranged, is no longer than approximately 60 percent of an axial length $H_A$ of the conically tapering bearing surface 4. The restraint ribs 6 thus only work to advantage after the countersunk head screw in accordance with the invention has been almost completely screwed in. This prevents spinning of the screw and protects turns of the threads that have been shaped or cut into the material.

The longitudinal extents $L_R$ of the restraint ribs 6 can, as illustrated, follow surface lines of the bearing surface 4, with their projections falling on a section of the longitudinal axis X—X of the screw in accordance with the invention which runs through the head 1. In this manner, the effect of the restraint ribs 6, increasing the compression between screw and material, is particularly large.

Figure 2:
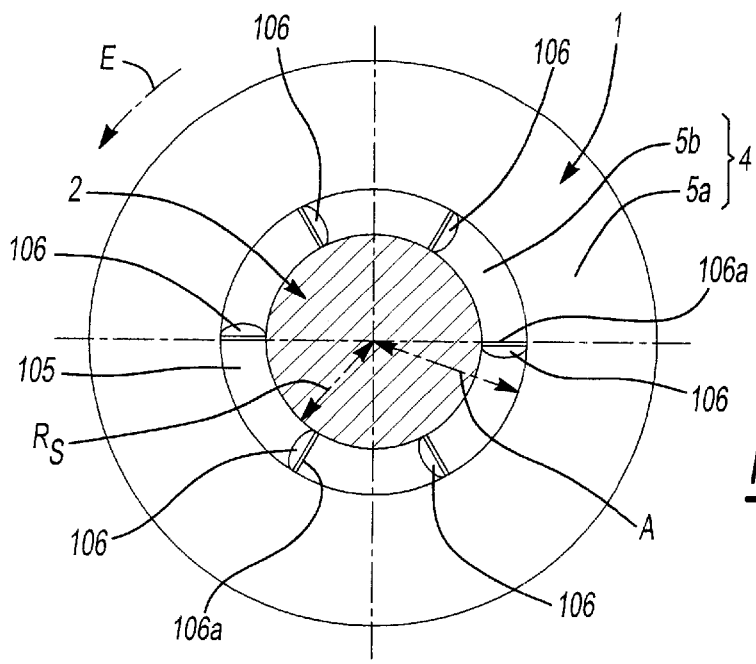
FIG. 2 is the first embodiment of a screw in accordance with the invention in a view cut along the line II—II in FIG. 1.

Considering their optimal arrangement for effectiveness, the restraint ribs 6 (as seen in a bottom view or in the cross sectional view shown in FIG. 2) can extend into an annular area, approximately bounded on the outside by the outer radius $R_K$ of head 1, and approximately bounded on the inside by the outer radius A of the thread 3.

There is moreover an additional advantage when the restraint ribs 6 feature a variable height $H_{RB}$ across their longitudinal extent $L_R$. In the shown drawing, the height $H_{RB}$ of the restraint ribs 6 extends along the longitudinal extent $L_R$ of the restraint ribs 6, starting with a value of zero relative to the bearing surface 4, proceeding in the shape of an arc, and then ending again with a value of zero relative to the bearing surface 4. The maximum value of the height $H_{RB}$ of the restraint ribs 6 relative to the surface 4 can thereby favorably be approximately 0.1 to 0.2 mm, especially when the external radius $R_K$ of the head 1 is approximately 4 to 5 mm.

As illustrated, the restraint ribs 6 can each feature two lateral faces 6a, 6b of convex shape, in the shape of discuss segment in particular. The faces 6a, 6b thereby adjoin each other at an edge 6c, located at their center in particular. On the one hand, a high frictional resistance is thereby attained, especially when screwing in. However a cutting effect from the restraint ribs will be largely avoided, whether screwing or unscrewing a screw in accordance with the invention.

The invention is not limited to the described examples, but includes all embodiments that work the same way as the idea of the invention. For example, the shape and arrangement of the cutting ribs 106 can deviate from the embodiment described. Thus it can be appropriate, depending on circumstances, that the longitudinal extents $L_F$ of the cutting ribs 106 do not, as illustrated, follow surface lines of the bearing surface 4, with their projections falling on a cross section of the longitudinal axis X—X of the screw in accordance with the invention which runs through the head 1, but (similarly to thread 3) follow a helically shaped path that runs at least partially in the direction of the perimeter.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

| | LIST OF REFERENCE SIGNS |
| --- | --- |
| 1 | head |
| 2 | shank |
| 2a | region of 2 near the head |
| 3 | thread |
| 4 | bearing surface of 1 |
| 5 | top region of 4 |
| 5a | first converging zone of 4 (angle α) |
| 5b | first converging zone of 4 (angle β) |
| 6 | restraint rib |
| 6a, 6b | lateral faces of 6 |
| 6c | edge between 6a and 6b |
| 7 | edge of thread 3 |
| 8 | end region of 3 |
| 105 | lower region of 4 |
| 106 | cutting rib |
| 106a | edge of 106 |
| A | outer radius of 3 (distance from 7 to X-X) |

-continued

LIST OF REFERENCE SIGNS

| | |
|---|---|
| E | inward direction of screw |
| $H_A$ | axial length of 4 |
| $H_B$ | axial length of 5 |
| $H_F$ | axial length of 105 in the region of 4 |
| $H_K$ | height of 7 |
| $H_{RB}$ | height of 6 |
| $H_{RF}$ | height of 106 |
| $H_T$ | axial length of 106 in the region of 2a |
| $L_F$ | longitudinal extent of 106 |
| $L_R$ | longitudinal extent of 6 |
| P | projection of 6 onto X-X |
| $R_E$ | core radius of 2 |
| $R_K$ | outer radius of 1 |
| $R_5$ | radius of 2 in 2a |
| X-X | longitudinal axis of screw (through 1 and 2) |
| α | convergence angle of 5a |
| β | convergence angle of 5b |

I claim:

1. A countersunk head screw comprising a head and a shank, a thread extending at least partially over said shank, at least a section of said head having a bearing surface that tapers conically toward said shank, and at least one cutting rib arranged in a lower region of said bearing surface that is facing said shank wherein said thread has an edge and said shank has an external radius, said edge maintaining a constant outer radius along at least a section of said shank, said at least one cutting rib located on an annular area, said annular area being approximately bounded on a side by said outer radius of said edge and approximately bounded on another side by said external radius of said shank.

2. The countersunk head screw as recited in claim 1, wherein said lower region of said bearing surface has an axial length and said conically tapering bearing surface has an axial length, said axial length of said lower region of said bearing surface being no longer than approximately 60 percent of said axial length of said conically tapering bearing surface.

3. The countersunk head screw as recited in claim 1, wherein said at least one cutting rib has a longitudinal extent and a projection, said longitudinal extent of said at least one cutting rib following a surface line of said bearing surface, said projections falling on a section of a longitudinal axis running through said head.

4. The countersunk head screw as recited in claim 1, wherein said at least one cutting rib has an overall outline and an edge, at least a segment of said overall outline being approximately circular in shape, said edge being flat and extending from said segment.

5. The countersunk head screw as recited in claim 1, wherein said at least one cutting rib has a longitudinal extent, said at least one cutting rib having a variable height across said longitudinal extent.

6. The countersunk head screw as recited in claim 5, wherein said variable height of said at least one cutting rib increases along said longitudinal extent of said at least one cutting rib starting with a value of zero relative to said bearing surface and then staying approximately constant relative to said bearing surface.

7. The countersunk head screw as recited in claim 6, wherein said variable height of said at least one cutting rib has a maximum value, said maximum value of said variable height of said at least one cutting rib relative to said bearing surface is approximately 0.3 mm.

8. The countersunk head screw as recited in claim 6, wherein said variable height of said at least one cutting rib has a maximum value, said maximum value of said variable height of said at least one cutting rib relative to said bearing surface is approximately 0.3 mm and said external radius of said head is approximately 4 mm to 5 mm.

9. The countersunk head screw as recited in claim 1, wherein said at least one cutting rib is selected from the group consisting of 4, 5, 6, 7, and 8 cutting ribs.

10. The countersunk head screw as recited in claim 1, wherein said bearing surface includes a first region and a second region, said bearing surface tapering conically toward said shank converges at an angle of approximately 90° in said first region turned away from said shank and said bearing surface tapering conically toward said shank converges at an angle of approximately 50° to 65° in said second region facing said shank.

11. The countersunk head screw as recited in claim 1, wherein said bearing surface has a first region and a second region, said at least one cutting rib being arranged in said second region facing said shank.

12. The countersunk head screw as recited in claim 1, wherein at least one restraint rib is arranged in a top region of said bearing surface turned away from said shank.

13. The countersunk head screw as recited in claim 12, wherein said top region of said bearing surface has an axial length and said conically tapering bearing surface has an axial length, said axial length of said top region of said bearing surface being no longer than approximately 60% of said axial length of said conically tapering bearing surface.

14. The countersunk head screw as recited in claim 12, wherein said at least one restraint rib has a longitudinal extent and a projection, said longitudinal extent of said restraint rib following a surface line of said bearing surface, said projection falling onto a section of a longitudinal axis running through said head.

15. The countersunk head screw as recited in claim 12, wherein said head has an outer radius and said thread has a constant outer radius along at least a section of said shank, said at least one restraint rib located on an annular area, said annular area being approximately bounded on the outside by said outer radius of said head and approximately bounded on the inside by said outer radius of said thread.

16. The countersunk head screw as recited in claim 12, wherein said at least one restraint rib includes an edge and two lateral faces of convex shape, said two lateral faces adjoining each other at said edge, said edge being centered relative to said two lateral faces.

17. The countersunk head screw as recited in claim 12, wherein said at least one restraint rib has a longitudinal extent, said at least one restraint rib having a variable height across said longitudinal extent.

18. The countersunk head screw as recited in claim 17, wherein said variable height of said at least one restraint rib extends along said longitudinal extent of said at least one restraint rib starting with a value of zero relative to said bearing surface, proceeding in the shape of an arc, and ending with a value of zero relative to said bearing surface.

19. The countersunk head screw as recited in claim 17, wherein said variable height of said at least one restraint rib has a maximum value, said maximum value of said variable height of said at least one restraint rib is approximately 0.1 to 0.2 mm relative to said bearing surface.

20. The countersunk head screw as recited in claim 17, wherein said head has an external radius and said variable height of said at least one restraint rib has a maximum value, said maximum value of said variable height of said at least one restraint rib is approximately 0.1 to 0.2 mm relative to said bearing surface and said external radius of said head is approximately 4 to 5 mm.

21. The countersunk head screw as recited in claim 12, wherein said at least one restraint rib is selected from the group consisting of 2, 3, 4, 5, and 6 restraint ribs.

22. The countersunk head screw as recited in claim 21, wherein said at least one restraint rib is arranged in said first head section turned away from said shank.

23. The countersunk head screw as recited in claim 1, wherein said at least one cutting rib has an overall outline and an edge, at least a segment of said overall outline being approximately circular in shape, said edge being concave and extending from said segment.

* * * * *